(12) United States Patent
Choi et al.

(10) Patent No.: US 12,366,866 B2
(45) Date of Patent: Jul. 22, 2025

(54) ROBOT FOR GUIDING AN EVACUATION ROUTE FOR PERSONS IN THE SPACE IN THE EVENT OF EMERGENCY AND METHOD FOR CONTROLLING THE SAME CORRESPONDING OBJECT WITH REGARD TO THE SPACE

(71) Applicant: CORNERS CO., LTD., Seoul (KR)

(72) Inventors: Jang Won Choi, Seoul (KR); Tae Kyu Han, Seoul (KR); Ho Jung Lim, Seoul (KR); Dong Oh Kim, Seoul (KR)

(73) Assignee: CORNERS CO. LTD., Seoul (KR)

( * ) Notice: Subject to any disclaimer, the term of this patent is extended or adjusted under 35 U.S.C. 154(b) by 0 days.

(21) Appl. No.: 18/644,617

(22) Filed: Apr. 24, 2024

(65) Prior Publication Data
US 2025/0155897 A1    May 15, 2025

(30) Foreign Application Priority Data
Nov. 13, 2023 (KR) .......................... 10-2023-0156262

(51) Int. Cl.
*G05D 1/639* (2024.01)
*A62B 3/00* (2006.01)
(Continued)

(52) U.S. Cl.
CPC ............... *G05D 1/639* (2024.01); *A62B 3/00* (2013.01); *G05D 1/2462* (2024.01); *G05D 1/686* (2024.01);
(Continued)

(58) Field of Classification Search
CPC ........ A62B 3/00; G05D 1/639; G05D 1/2462; G05D 1/686; G05D 2101/22;
(Continued)

(56) References Cited

U.S. PATENT DOCUMENTS

| | | | |
|---|---|---|---|
| 10,424,204 B1 * | 9/2019 | Han | G01S 13/931 |
| 11,747,819 B1 * | 9/2023 | Ebrahimi Afrouzi | G05D 1/0221 701/423 |

(Continued)

FOREIGN PATENT DOCUMENTS

| | | | |
|---|---|---|---|
| KR | 10-2005-0024840 A | | 3/2005 |
| KR | 20160003553 A | * | 6/2015 |

(Continued)

OTHER PUBLICATIONS

Decision to grant a patent dated Mar. 5, 2024, issued in counterpart of KR Patent Application No. 10-2023-0156262, with English Translation. (6 pages).

(Continued)

*Primary Examiner* — Mohamed Abdo Algehaim
(74) *Attorney, Agent, or Firm* — WHDA, LLP

(57) ABSTRACT

Provided is a robot control method that controls a robot to guide an evacuation route in response to occurrence of an emergency situation. The robot may acquire evacuation route information on a space from a server when an emergency situation occurs in the space, and may move to a first node closest to the robot among nodes defined in the space and a second node indicated by direction information of the first node based on the evacuation route information and a current location of the robot.

7 Claims, 9 Drawing Sheets

US 12,366,866 B2

Page 2

(51) Int. Cl.
*G05D 1/246* (2024.01)
*G05D 1/686* (2024.01)
*G05D 101/00* (2024.01)
*G05D 105/55* (2024.01)

(52) U.S. Cl.
CPC ..... *G05D 2101/22* (2024.01); *G05D 2105/55* (2024.01)

(58) Field of Classification Search
CPC ........ G05D 2105/55; G05D 1/00–1/87; G05D 2105/00–2105/93; G05D 2107/00–2107/95; G05D 1/644–6484; G05D 1/617; G05D 1/244–2446; G05D 1/229–2295
USPC .......................................................... 701/24
See application file for complete search history.

(56) References Cited

U.S. PATENT DOCUMENTS

| | | | | |
|---|---|---|---|---|
| 12,032,377 | B2* | 7/2024 | Guo | G05D 1/249 |
| 2016/0005229 | A1* | 1/2016 | Lee | G06T 11/60 345/419 |
| 2016/0047663 | A1* | 2/2016 | Iyer | G01C 21/206 701/411 |
| 2016/0148417 | A1* | 5/2016 | Kim | G06F 3/14 345/419 |
| 2016/0237677 | A1* | 8/2016 | McGarrah | A62B 3/00 |
| 2017/0185085 | A1* | 6/2017 | Storfer | G08G 1/207 |
| 2017/0304659 | A1* | 10/2017 | Chen | G08B 7/066 |
| 2019/0087772 | A1* | 3/2019 | Medina | G05D 1/0246 |
| 2019/0179325 | A1* | 6/2019 | Deng | A47L 11/4011 |
| 2019/0217131 | A1* | 7/2019 | Zechlin | G06V 20/20 |
| 2019/0291277 | A1* | 9/2019 | Oleynik | B25J 9/1669 |
| 2019/0325548 | A1* | 10/2019 | Kumar | B66B 5/024 |
| 2020/0080850 | A1* | 3/2020 | Mori | G01C 21/34 |
| 2020/0107145 | A1* | 4/2020 | Heggeland | G08B 29/24 |
| 2021/0018929 | A1* | 1/2021 | Choi | G05D 1/024 |
| 2021/0110683 | A1* | 4/2021 | Guan | G01C 21/3461 |
| 2021/0147202 | A1* | 5/2021 | Black | G05D 1/0212 |
| 2021/0191405 | A1* | 6/2021 | Ma'As | G06N 3/044 |
| 2022/0019235 | A1* | 1/2022 | Machida | G05D 1/0289 |
| 2022/0282987 | A1* | 9/2022 | Nakai | G01C 21/30 |
| 2022/0329988 | A1* | 10/2022 | Zhu | H04W 4/80 |
| 2022/0382282 | A1* | 12/2022 | Guo | G05D 1/0246 |
| 2022/0397694 | A1* | 12/2022 | Xiang | G01V 3/08 |
| 2023/0102509 | A1* | 3/2023 | Jun | A62B 3/00 703/1 |
| 2023/0213934 | A1* | 7/2023 | Koyama | G05D 1/0088 701/2 |
| 2023/0315117 | A1* | 10/2023 | Komuro | G05D 1/0246 701/23 |
| 2023/0333570 | A1* | 10/2023 | Frederick | G05D 1/249 |
| 2024/0069571 | A1* | 2/2024 | Yoon | B25J 9/16 |
| 2024/0103543 | A1* | 3/2024 | Ryu | B25J 5/007 |
| 2024/0161597 | A1* | 5/2024 | Cho | G05D 1/689 |

FOREIGN PATENT DOCUMENTS

| | | |
|---|---|---|
| KR | 10-2016-0003553 A | 1/2016 |
| KR | 20200084382 A * | 12/2018 |
| KR | 10-2020-0084382 A | 7/2020 |
| KR | 10-2302575 A | 9/2021 |

OTHER PUBLICATIONS

Written Opinion dated Feb. 20, 2024, issued in counterpart of KR Patent Application No. 10-2023-0156262, with English Translation. (8 pages).

Request for the Submission of an Opinion dated Feb. 20, 2024, issued in counterpart of KR Patent Application No. 10-2023-0156262, with English Translation. (10 pages).

* cited by examiner

ROBOT FOR GUIDING AN EVACUATION
ROUTE FOR PERSONS IN THE SPACE IN
THE EVENT OF EMERGENCY AND
METHOD FOR CONTROLLING THE SAME
CORRESPONDING OBJECT WITH REGARD
TO THE SPACE

CROSS-REFERENCE TO RELATED
APPLICATION(S)

This application claims the priority benefit of Korean Patent Application No. 10-2023-0156262, filed on Nov. 13, 2023, in the Korean Intellectual Property Office, the disclosure of which is incorporated herein by reference.

BACKGROUND

1. Field of the Invention

The following example embodiments relate to a robot control method for controlling a robot to guide an evacuation route for persons in a space in response to occurrence of an emergency situation in the space and the robot.

2. Description of the Related Art

If an emergency situation occurs in a space such as indoors or outdoors, it is necessary to notify persons in the space of occurrence of the emergency situation and to evacuate the persons in the space to a safe area such as an appropriate exit. In particular, when persons in the space need to quickly evacuate, such as when a fire or a shooting incident occurs, the evacuation route to the safe area needs to be guided to the persons.

However, when the emergency situation occurs, an environment inside the space becomes chaotic and the persons in the space become psychologically unstable. Therefore, although the evacuation route is guided to the persons in the space through auditory information or visual information, the evacuation route may not be properly delivered to the persons in the space in many cases. Also, to guide the evacuation route through auditory information or visual information, separate speakers or lighting devices (e.g., visual indicator, etc.) need to be installed at a plurality of points in the space.

Korean Patent Laid-Open Publication No. 10-2005-0024840 relates to technology for a path planning method for an autonomous mobile robot and describes a method of planning an optimal route through which a mobile robot autonomously traveling in a home or an office may safely and quickly move to a target point while avoiding obstacles.

The aforementioned information is provided to simply help understanding and may include contents that does not form a portion of the related art.

SUMMARY

Example embodiments may provide a method that may control a robot to guide an appropriate evacuation route to persons in a space in response to occurrence of an emergency situation in the space using the robot that autonomously travels in the space.

Example embodiments may provide a method that may control a movement of a robot to a destination node based on evacuation route information including direction information and attribute information of each node acquired from a server.

Example embodiments may provide a method that may control a robot to move along an appropriate evacuation route without a need to install a navigation algorithm in a robot, alternatively/additionally may provide a method that may reconfigure an appropriate evacuation route using the navigation algorithm and may control a robot to move along the reconfigured evacuation route.

According to an aspect, there is provided a robot control method performed by a robot that travels in a space, the robot control method including acquiring evacuation route information on the space from a server when an emergency situation occurs in the space, the evacuation route information including node information on each node of a plurality of nodes defined in the space and the node information including direction information on a direction from the each node to another node to which the robot needs to move; and moving the robot toward a first node among the nodes closest to the robot or a second node indicated by direction information of the first node, based on the evacuation route information and a current location of the robot, wherein the direction information represents an optimal route from the each node to a destination node to which the robot needs to move among the nodes, and the robot is controlled to move to the destination node based on the evacuation route information.

The node information may include attribute information representing an attribute of the each node, the destination node may include a first attribute indicating a safe area for the emergency situation as the attribute information, the optimal route may represent a route to move from the each node to the destination node, avoiding a danger node that includes a second attribute indicating a danger area for the emergency situation as the attribute information among the nodes, and the first node and the second node may not include the second attribute as the attribute information.

The robot may be controlled to move to the destination node in response to repeatedly performing the moving the robot, and the moving of the robot may include identifying the first node closest to the robot from among the nodes based on the evacuation route information and the current location of the robot; determining a distance between the first node and the current location; moving the robot toward the first node if the distance is greater than a predetermined first distance; and moving the robot toward the second node if the distance is less than or equal to the first distance.

In response to a change in the emergency situation, the evacuation route information may be changed, the changed evacuation route information may indicate that the attribute information and the direction information associated with at least one node among the plurality of nodes are changed and the optimal route by the evacuation route information is changed in response to the changed evacuation route information, and the robot control method may further include acquiring the changed evacuation route information from the server; and moving the robot toward a third node closest to the robot among the nodes or a fourth node indicated by direction information of the third node, such that the robot moves to the destination node while avoiding the danger node based on the changed evacuation route information and the current location of the robot.

The robot control method may further include identifying an obstacle while moving to the first node or the second node; transmitting information on the obstacle to the server; acquiring, from the server, the changed evacuation route information generated by changing the evacuation route information based on information on the obstacle; and moving the robot toward a fifth node closest to the robot among the nodes or a sixth node indicated by direction information of the fifth node, such that the robot moves to the destination node while avoiding the obstacle based on the changed evacuation route information and the current location of the robot.

The robot control method may further include identifying whether a person is present within a predetermined second distance from the robot, and the moving of the robot may be performed to guide the person to the destination node when the person is present within the second distance.

The moving of the robot may include moving the robot while maintaining a distance between the person and the robot to be less than a predetermined third distance.

The robot control method may further include acquiring, from the server, information on a specific node that is a destination of the robot among the nodes and information on the danger area the robot needs to avoid in the space; and controlling the robot to move from the current location of the robot to the specific node while avoiding the danger area, based on a navigation algorithm installed on the robot.

The controlling of the robot may include designating a surrounding area of a node corresponding to the danger area among the nodes as a movement disallowing area of the robot; setting the specific node as a destination from the current location of the robot; and controlling the robot to move from the current location of the robot to the destination without entering the movement disallowing area.

The robot control method may further include identifying an obstacle while moving to the first node or the second node; and determining whether it is possible for the robot to avoid the obstacle and to move toward the first node or the second node based on a navigation algorithm installed on the robot, and the method may comprises moving the robot toward the first node or the second node according to moving the robot after avoiding the obstacle based on the navigation algorithm installed on the robot when it is possible for the robot to move based on the determination; and moving the robot toward a seventh node that is another node to which the robot is accessible by a shortest distance among the nodes or an eighth node indicated by direction information of the seventh node, based on the evacuation route information, the current location of the robot, and the obstacle when it is not possible for the robot to move.

According to some example embodiments, it is possible to intuitively guide an appropriate evacuation route to persons in a space in response to occurrence of an emergency situation in the space using a robot that autonomously travels in the space.

According to some example embodiments, since a movement of a robot to a destination node is controlled based on evacuation route information including direction information and attribute information of each node acquired from a server, operations for optimal route generation and danger area avoidance on a robot side when the robot moves from a current location to the destination node may be omitted.

Without a need to install separate speakers or lighting devices for guiding an optimal evacuation route to persons in a space when an emergency situation occurs, at a plurality of points in the space, it is possible to intuitively guide the evacuation route to the persons in the space.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
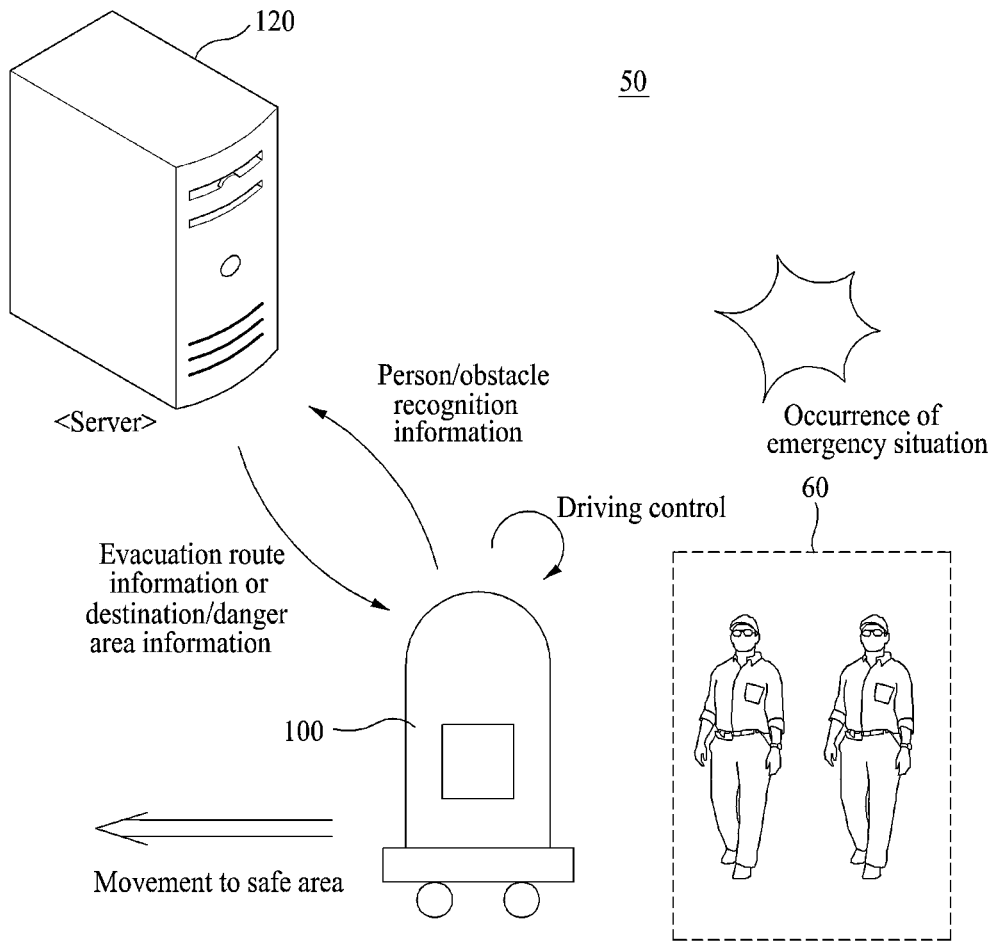
FIG. 1 illustrates a method of guiding an appropriate evacuation route to persons in a space in response to occurrence of an emergency situation using a robot that autonomously travels in the space according to an example embodiment.

Hereinafter, example embodiments will be described with reference to the accompanying drawings. Like reference numerals illustrated in each drawing refer to like elements throughout.

FIG. 1 illustrates a method of guiding an appropriate evacuation route to persons in a space in response to occurrence of an emergency situation using a robot that autonomously travels in the space according to an example embodiment.

FIG. 1 illustrates a robot 100 that travels in a space 50 and a server 120 that communicates with the robot 100. The robot 100 may be controlled on its own based on information and/or data received from the server 120, or may be controlled in response to a control instruction from the server 120 or another robot control system (e.g., cloud server).

The space 50 may represent the space 50 indoors and/or outdoors. That is, the space 50 may be the space 50 indoors or outdoors with specified range or the space 50 that includes both indoor and outdoor areas.

The robot 100 may be a service robot that provides a service to a person 60 (or persons) in the space 50, within the space 50, for example, interior of a building. For example, the robot 100 may be a service robot that provides a route guidance to a specific location in the space 50 to the person 60. Here, the robot 100 may recognize the person 60 while autonomously traveling in the space 50 and may provide a route guidance service to the recognized person 60.

In an example embodiment, a case in which an emergency situation occurs in the space 50 may be assumed. The emergency situation may be a situation in which the person 60 in the space 50 is required to evacuate to a specific area (or location) outside or inside the space 50. The emergency situation may be, for example, a fire situation, a gun accident situation, and a space collapse situation.

(1) When the emergency situation occurs in the space 50, the robot 100 may acquire evacuation route information from the server 120. The evacuation route information may include information on an optimal route through which the person 60 needs to move in the event of the emergency situation. The evacuation route information may be periodically transmitted from the server 120 to the robot 100, or may be transmitted to the robot 100 when the emergency situation is detected by the server 120 or the robot 100. The robot 100 may be controlled to move from a current location to a destination (e.g., entrance, safety location, etc.) based on the evacuation route information and the person 60 in the space 50 may move along the robot 100 and may evacuate from the emergency situation. Here, the evacuation route information may include direction information on a direction in which the robot 100 needs to move in order to finally move to the destination from each location (e.g., node to be described later) in the space 50 in which the robot 100 may move. Therefore, when the robot 100 moves from a current location to a destination node, operations for optimal route generation and danger area avoidance on the side of the robot 100 may be omitted and the robot 100 may be configured to not include a complex or expensive sensor or computing device. That is, a movement of the robot 100 may be controlled without operating a navigation algorithm (that may be installed on the robot 100).

(2) Alternatively/additionally, the robot 100 may acquire information on a danger area in the space 50 from the server 120 when the emergency situation occurs in the space 50. Also, depending on example embodiments, the robot 100 may further acquire, from the server 120, information on a destination to move. The danger area may represent, for example, an area that includes a location within the space 50 at which the emergency situation occurred. In the danger area, driving of the robot 100 may be prohibited. Information on the danger area (and destination information) may be transmitted to the robot 100 when the emergency situation is detected by the server 120 or the robot 100, or may be transmitted to the robot 100 in response to a request from an administrator of the server 120 or the robot 100. The robot 100 may be controlled to move from the current location to the destination (e.g., entrance, safe location, etc.) while avoiding the danger area based on the received information and the person 60 within the space 50 may evacuate from the emergency situation by moving along the robot 100. Here, driving of the robot 100 in moving to the destination may be controlled using the navigation algorithm installed on the robot 100.

As such, in an example embodiment, in controlling driving of the robot 100 to guide an appropriate evacuation route to the person 60 in the space 50 in response to occurrence of an emergency situation, the navigation algorithm of the robot 100 may not be used (i.e., there is no need to install the navigation algorithm for route generation to the robot 100), or the navigation algorithm of the robot 100 may be used as at least an auxiliary.

A more specific method of controlling the robot 100 to guide an appropriate evacuation route for the person 60 in the space 50 is further described with reference to FIGS. 2 to 12.

Figure 2:
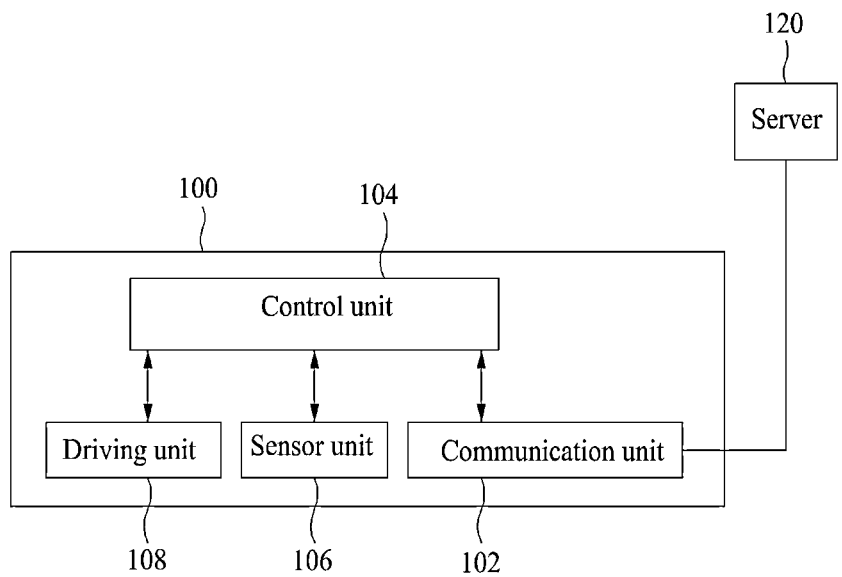
FIG. 2 is a block diagram illustrating a robot that autonomously travels in a space according to an example embodiment.

FIG. 2 is a block diagram illustrating a robot that autonomously travels in a space according to an example embodiment.

As described above, the robot 100 may be a service robot used to guide an evacuation route (or provide a route guidance service) to the person 60 when an emergency situation occurs in the space 50.

The robot 100 may be a physical device and, referring to FIG. 2, may include a control unit 104, a driving unit 108, a sensor unit 106, and a communication unit 102.

The control unit 104 may be a physical processor embedded in the robot 100 and may selectively include at least one of a module for route planning processing, a module for mapping processing, a module for driving control, a module for localization processing, a module for data processing, and a service processing module. Depending on example embodiments, at least one of the modules may be selectively included in the control unit 104 to enable autonomous driving of the robot 100 although communication between a robot control system or the server 120 and the robot 100 is not performed.

The communication unit 102 may be a component for communication between the robot 100 and another device (e.g., another robot or server 120). That is, the communication unit 102 may be a hardware module, such as an antenna, a data bus, a network interface card, a network interface chip, and a networking interface port of the robot 100 used to transmit/receive data and/or information to/from the other device, and a software module, such as a network device driver or a networking program.

The driving unit 108 may be a component for controlling and enabling a movement of the robot 100 and may include equipment for performing the same. For example, the driving unit 108 may include wheels and motors.

The sensor unit 106 may be a component for collecting data required for autonomous driving and service provision of the robot 100. The sensor unit 106 may include expensive sensing equipment (scanning equipment) or may include only a sensor, such as a low-priced ultrasonic sensor and/or a low-priced camera. The sensor unit 106 may include a sensor for identifying an obstacle/person located in a driving direction. Also, the sensor unit 106 may include a camera. The camera may be arranged to be capable of recognizing the person 60 present around the robot 100. The camera may be an RGB camera or a monocular camera. Alternatively, the camera may include a depth camera. The robot 100 (or robot control system) may determine a positional relationship between the person 60 recognized by the camera and the robot 100. The camera may be used to recognize a user and to measure a distance between the user and the robot 100. Alternatively/additionally, the sensor unit 106 may include light detection and range (LiDAR).

As a processing example of the control unit 104, the control unit 104 may control the robot 100 based on a map for the space 50 or a movement route for the space 50 acquired from the server 120. The control unit 104 may receive this information from the server 120 through the communication unit 102 and may control autonomous driving of the robot 100 by controlling the driving unit 108.

Driving of the robot 100 may be controlled using a map for the space 50 stored in a cloud (i.e., map on the server 120) or a map downloaded and stored from the server 120. Also, the robot 100 may be controlled to move to a destination or to avoid an obstacle according to a global route plan and/or a local route plan through the installed navigation algorithm. The map for the space 50 may be, for example, a map showing an area in which the robot 100 may travel in the space 50 in grayscale. Alternatively, the map for the space 50 refers to a map that is generated through 3D scanning for the space 50 and, for example, may be a map built based on point cloud data or built based on a 3D model pre-modeled for the space 50. Types of the map for the space 50 are not particularly limited.

Also, although not illustrated, the robot 100 may further include a speaker and/or a display or a light emitting diode (LED) (hereinafter, indicator output unit) for providing information/content. The robot 100 may output information related to an evacuation route to be guided to the person 60 through the indicator output unit. For example, the robot 100 may visually output a direction in which the person 60 needs to move or may output voice guidance for an emergency situation.

Meanwhile, the server 120 may include at least one computing device and may be located inside or outside the space 50. Although not illustrated, the server 120 may include a memory, a processor, a communicator, and an input/output (I/O) interface as the computing device.

Technical features described above with reference to FIG. 1 may apply to FIG. 2 and thus, repeated description is omitted.

In the following description, operations performed by components of the robot 100, the non-illustrated robot control system, or the server 120 may be explained as operations performed by the robot 100, the robot control system, or the server 120.

Also, at least some of operations and at least some of motions described to be performed by the robot 100 in the following description may be performed by the server 120 or the robot control system. The opposite is also true. In this regard, repeated description is omitted.

Figure 3:
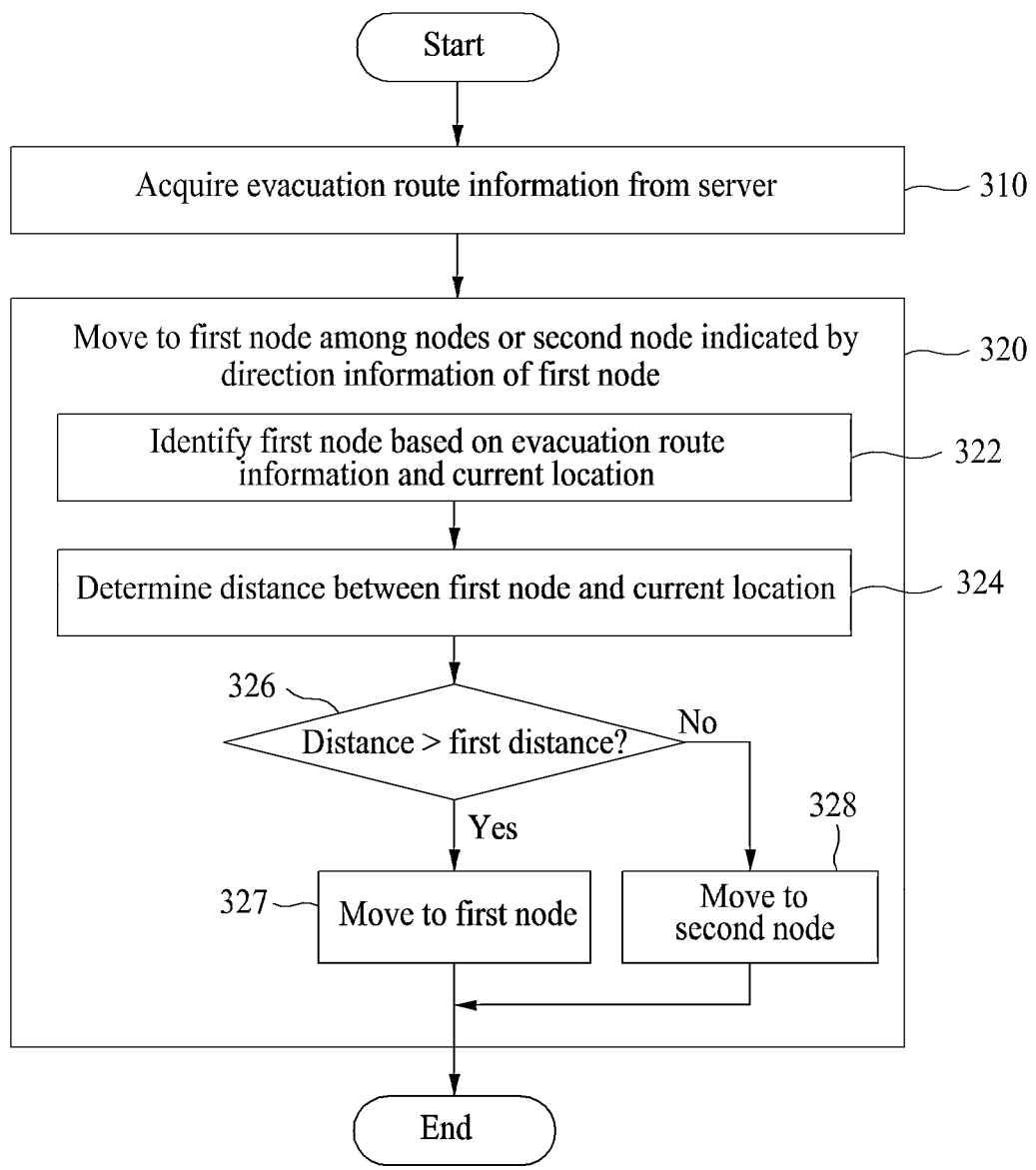
FIG. 3 is a flowchart illustrating a method of controlling a robot to guide an appropriate evacuation route to persons in a space in response to occurrence of an emergency situation using a robot that autonomously travels in the space according to an example embodiment.

FIG. 3 is a flowchart illustrating a method of controlling a robot to guide an appropriate evacuation route to persons in a space in response to occurrence of an emergency situation using a robot that autonomously travels in the space according to an example embodiment.

A robot control method performed by the robot 100 that travels in the space 50 is described with reference to FIG. 3.

In operation 310, when an emergency situation occurs in the space 50, the robot 100 may acquire evacuation route information on the space 50 from the server 120. The evacuation route information may be periodically transmitted from the server 120 to the robot 100, or may be transmitted to the robot 100 when the emergency situation is detected by the server 120 or the robot 100. Here, when the robot 100 detects the emergency situation, the robot 100 may request the evacuation route information to the server 120.

For example, when an administrator notifies the server 120 of occurrence of the emergency situation (or, when the administrator notifies the robot 100 of occurrence of the emergency situation and the robot 100 makes a request), the evacuation route information may be transmitted from the server 120 to the robot 100. The robot 100 may receive a notification indicating start of emergency evacuation. Alternatively, the occurrence of the emergency situation in the space 50 may be automatically detected. For example, when a fire is detected or when a gunshot is detected through a sensor (e.g., closed-circuit television (CCTV), sound sensor, heat detection sensor, smoke detection sensor, etc.) provided in the space 50, the emergency situation may be automatically detected and this detection may be notified to the server 120.

The evacuation route information may include information on an optimal route through which the person 60 needs to move in the event of the emergency situation. The evacuation route information may include information on a location at which the emergency situation occurred. The optimal route may be a movement route of the robot 100 and the person 60 that avoid a danger area corresponding to the location at which the emergency situation occurred.

The evacuation route information may include node information on each node among a plurality of nodes defined in the space 50. The node information may include direction information on a direction from each node to another node to which the robot 100 needs to move. Also, the node information may include attribute information representing an attribute of each node. Also, the node information may further include location information (e.g., location coordinates) of each node. The evacuation route information may include a map for the space 50. Alternatively, for example, this map may be downloaded from the server 120 and pre-stored in the robot 100.

The attribute information may include information indicating a type of each node. The type of each node may include, for example, a 'normal node,' a 'danger node,' and a 'destination node (safe node).' Attribute information included in the destination node may be a first attribute indicating a safe area for the emergency situation. Attribute information included in the danger node may be a second attribute indicating a danger area for the emergency situation. The danger node may represent an occurrence location or surrounding of the emergency situation. Attribute information included in the normal node may be a third attribute indicating a general area in the space 50.

Meanwhile, the danger node may not include direction information or may include direction information indicating 'no movement.' Also, the destination node may not include direction information, may include direction information indicating an exit direction (or a direction indicating an outdoor area if the space 50 is indoors), or may include direction information indicating 'no further movement is necessary.'

The direction information may represent an optimal route from each node to the destination node to which the robot 100 needs to move among the nodes. Here, the optimal route may include a movement direction from each node to a next node to which the robot 100 and the person 60 need to move in order to move to the destination node.

An example of evacuation route information is further described with reference to FIG. 9. In this regard, FIG. 9 illustrates evacuation route information configured by a server according to an example.

Figure 9:
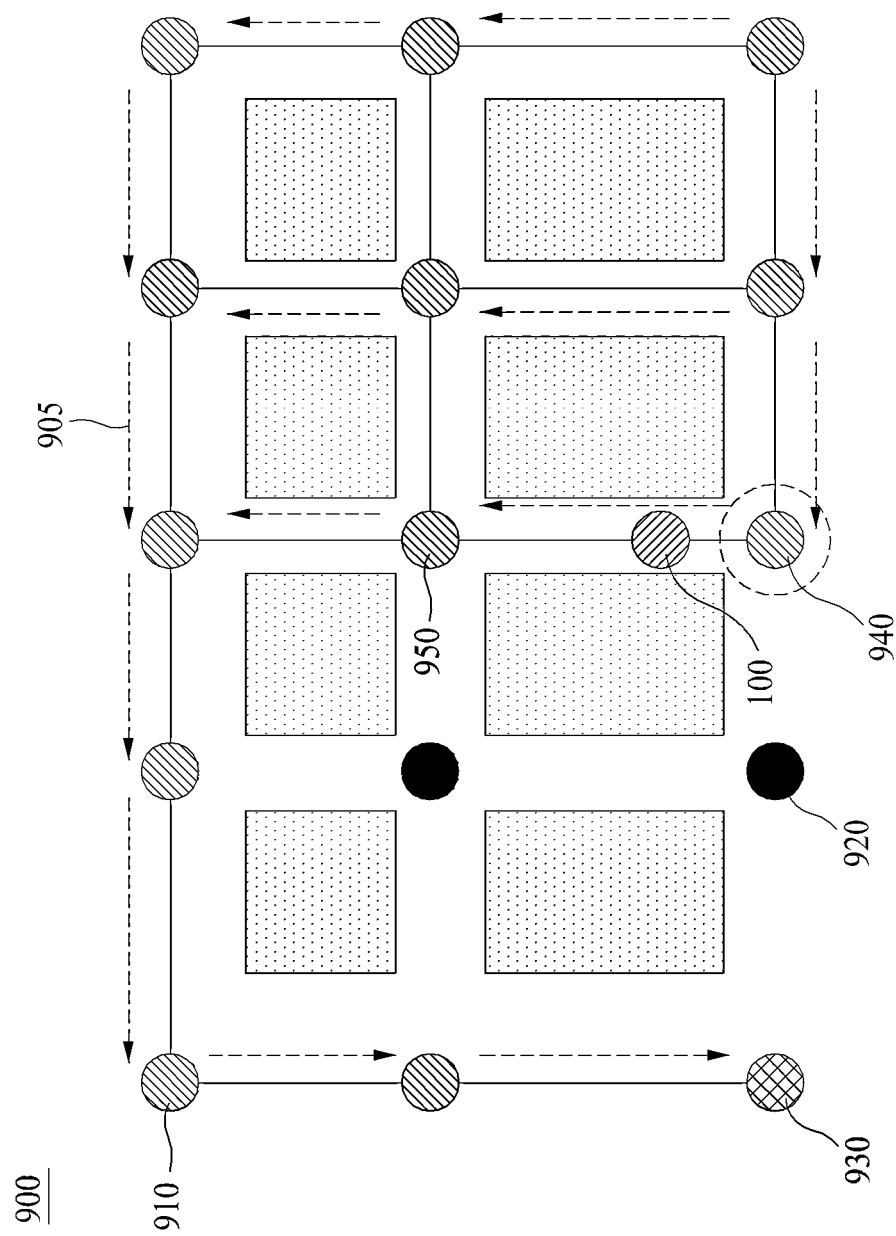
FIG. 9 illustrates evacuation route information configured by a server according to an example.

FIG. 9 illustrates evacuation route information 900. The evacuation route information 900 may include node information on each of nodes 910 to 940 defined in the space 50. The node information may include attribute information indicating a type of each node. In an example of FIG. 9, the node 910 may represent the aforementioned normal node, the node 920 may represent the aforementioned danger node, and the node 930 may represent the aforementioned destination node. Each node may include direction information 905 on a direction from each node to another node to which the robot 100 needs to move. The direction information 905 may be the aforementioned optimal route or a portion of the optimal route. Referring to FIG. 9, the direction information 905 of each node may be the optimal route (or portion thereof) for moving from each corresponding node to the destination node 930. The movement of the robot 100 may be controlled based on the evacuation route information 900 and a current location of the robot 100.

As shown in FIG. 9, each node may correspond to a final destination or a waypoint of the robot 100 and may be associated with attribute information. Whether it is possible for the robot 100 to move to a corresponding node may be determined based on the attribute information. Meanwhile, a portion that connects between two nodes may be defined as an edge. The edge may correspond to a route through which the robot 100 moves between the two nodes. The edge may be associated with information on a direction in which the robot 100 may travel (e.g., may move in one direction or move in both directions). The direction information 905 of each node may be determined based on information on a possible driving direction associated with each edge. That is, the direction information 905 of each node may not contradict information on the possible driving direction associated with each edge.

In operation 320, the robot 100 may be controlled to move toward a first node closest to the robot 100 among the nodes based on the evacuation route information 900 and the current location of the robot 100 or a second node indicated by direction information of the first node. The node closest to the robot 100 may represent a node to which the robot 100 is accessible by moving the shortest distance. Here, the first node and the second node may not include the second attribute as the attribute information. That is, the first node and the second node may not be danger nodes.

Referring to FIG. 9, the robot 100 may move toward the node 940 that is a closet normal node from the current location based on the evacuation route information 900 and the current location. Here, the robot 100 may be controlled to move to a next node (i.e., a node above the node 940) indicated by the direction information 905 of the node 940 before arriving at the node 940. Alternatively, depending on example embodiments, the robot 100 may be controlled to move to the next node indicated by the direction information 905 after arriving at the node 940. The robot 100 may not move to the danger node 920 and the optimal route indicated by the direction information 905 may be configured to avoid the danger node 920. The robot 100 may arrive at the destination node 930 by moving along each of the nodes based on the direction information 905 indicated by the nodes.

That is, in an example embodiment, the optimal route associated with each node (direction information 905 of each node) may represent a route for moving from each node (normal node) to the destination node 930, while avoiding the danger node 920 that includes the second attribute indicating the danger area. This direction information 905 may be at least a portion of the entire route from each node to the destination node 930.

By controlling the movement of the robot 100 in this manner, the robot 100 may be controlled to move to the destination node 930 based on the evacuation route information 900. The person 60 within the space 50 may move to the destination node 930 that is a safe area along the optimal route by moving along the robot 100 that travels in the space 50.

Figure 10:
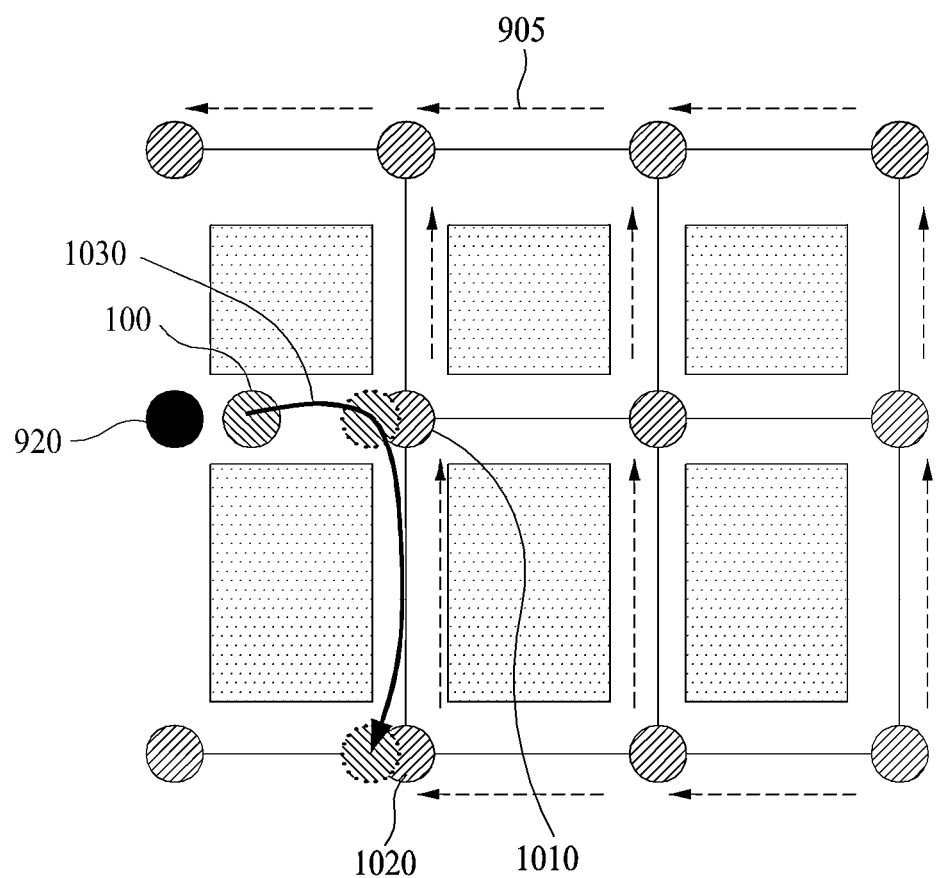
FIG. 10 illustrates a method for a robot to move based on a current location of the robot and evacuation route information according to an example.

Hereinafter, a method of controlling the movement of the robot 100 is further described with reference to operations 322 to 328 and FIG. 10. In this regard, FIG. 10 illustrates a method of moving a robot based on a current location of the robot and evacuation route information according to an example.

The robot 100 may be controlled to move to the destination node 930 by repeatedly performing operation 320 (i.e., operations 322 to 328).

In operation 322, the robot 100 may identify a first node 1010 closest to the robot 100 among nodes based on the evacuation route information 900 and the current location of the robot 100. The first node 1010 may be a normal node. Therefore, although the danger node 920 is closer than the first node 1010, the robot 100 does not move toward the danger node 920 since the danger node 920 is an object to be avoided.

In operation 324, the robot 100 may determine a distance between the first node 1010 and the current location. For example, the robot 100 may determine the distance between the first node 1010 and the current location based on the current location verified through positioning in the space 50 and location information of the first node 1010 included in evacuation space information.

In operation 326, the robot 100 may determine whether the distance determined in operation 324 is greater than a predetermined first distance. The first distance may be, for example, 1 m, and may be set by the administrator of the server 120 or the robot 100.

In operation 327, when the distance determined in operation 324 is greater than the first distance, the robot 100 may be controlled to move toward the identified first node 1010.

In operation 328, when the distance determined in operation 324 is less than or equal to the first distance, the robot 100 may be controlled to move toward a second node 1020. The second node 1020 is a node to which the robot 100 needs to move after the first node 1010 and may be a node indicated by the direction information 905 of the first node 1010.

As described above, operations 322 to 328 may be repeatedly performed. For example, while the robot 100 is moving toward the first node 1010, whether the distance between the robot 100 and the first node 1010 is less than or equal to the first distance may be continuously determined. When the distance between the robot 100 and the first node 1010 is less than or equal to the first distance, the robot 100 may move toward the second node 1020. While the robot 100 is moving toward the second node 1020, whether a distance between the robot 100 and the second node 1020 is less than or equal to the first distance may be continuously determined. When the distance between the robot 100 and the second node 1020 is less than or equal to the first distance, the robot 100 may move toward a next node indicated by the direction information 905 of the second node 1020.

Therefore, the robot 100 may be controlled to move along a trajectory, such as a route 1030 shown in FIG. 10, from the current location. As shown in the route 1030, the robot 100 may not directly pass through the first node 1010 and the second node 1020.

As a result, the robot 100 may be controlled to move to the destination node 930 indicating the safe area based on the acquired evacuation route information 900 without executing the complex navigation algorithm on the robot 100 and may guide an evacuation route to the person 60 in the space 50.

Technical features described above with reference to FIGS. 1 and 2 may apply to FIGS. 3, 9, and 10 as is and thus, repeated description is omitted.

Figure 4:
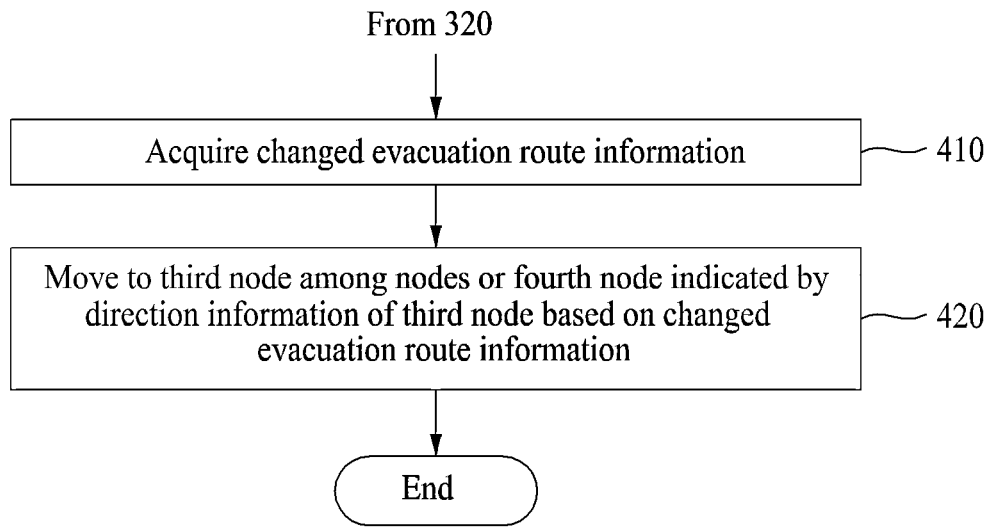
FIG. 4 is a flowchart illustrating a method of controlling a robot to acquire changed evacuation route information in response to a change in an emergency situation and to guide an appropriate evacuation route to persons in a space according to an example.

FIG. 4 is a flowchart illustrating a method of controlling a robot to acquire changed evacuation route information in response to a change in an emergency situation and to guide an appropriate evacuation route to persons in a space according to an example.

A method of controlling a movement of the robot 100 in response to evacuation route information acquired by the robot 100 being changed according to a change in an emergency situation is described with reference to FIG. 4.

For example, the emergency situation in the space 50 may change over time, such as when a fire spreads or when a shooter moves in a gun accident. According to the change in the emergency situation, the server 120 may update the evacuation route information. The updated evacuation route information may also be referred to as 'changed evacuation route information.'

The changed evacuation route information may represent that attribute information and direction information associated with at least one node among the plurality of nodes defined in the space 50 is changed. Therefore, the optimal route to the destination node 930 according to the evacuation route information before the change may be changed according to the changed evacuation route information. For example, in the changed evacuation route information, a location of the danger node 920 and/or the number of the danger nodes 920 may be changed in response to the change in the emergency situation. Since the location of the danger node 920 and/or the number thereof are changed, the optimal route to the destination node 930 for avoiding the danger node 920 may be changed. Therefore, direction information of at least one node may be changed. Alternatively, in the changed evacuation route information, the destination node 930 corresponding to the safe area may be changed to another node in response to the change in the emergency situation. The optimal route may be changed accordingly.

In operation 410, the robot 100 may acquire the changed evacuation route information from the server 120.

In operation 420, the robot 100 may be controlled to move toward a third node closest to the robot 100 among the nodes or a fourth node indicated by direction information of the third node, such that the robot 100 moves to the destination node 930 while avoiding the danger node 920 based on the changed evacuation route information and the current location of the robot 100. Here, the third node may correspond to the aforementioned first node that is redetermined based on the changed evacuation route information.

Acquisition of the changed evacuation route information in operation 410 may be performed every time the change in the emergency situation is detected, or periodically. Contents related to detecting the emergency situation described above in operation 310 may apply to detecting the change in the emergency situation and thus, repeated description is omitted.

Technical features described above with reference to FIGS. 1 to 3, 9, and 10 may apply to FIG. 4 as is and thus, repeated description is omitted.

Figure 5:
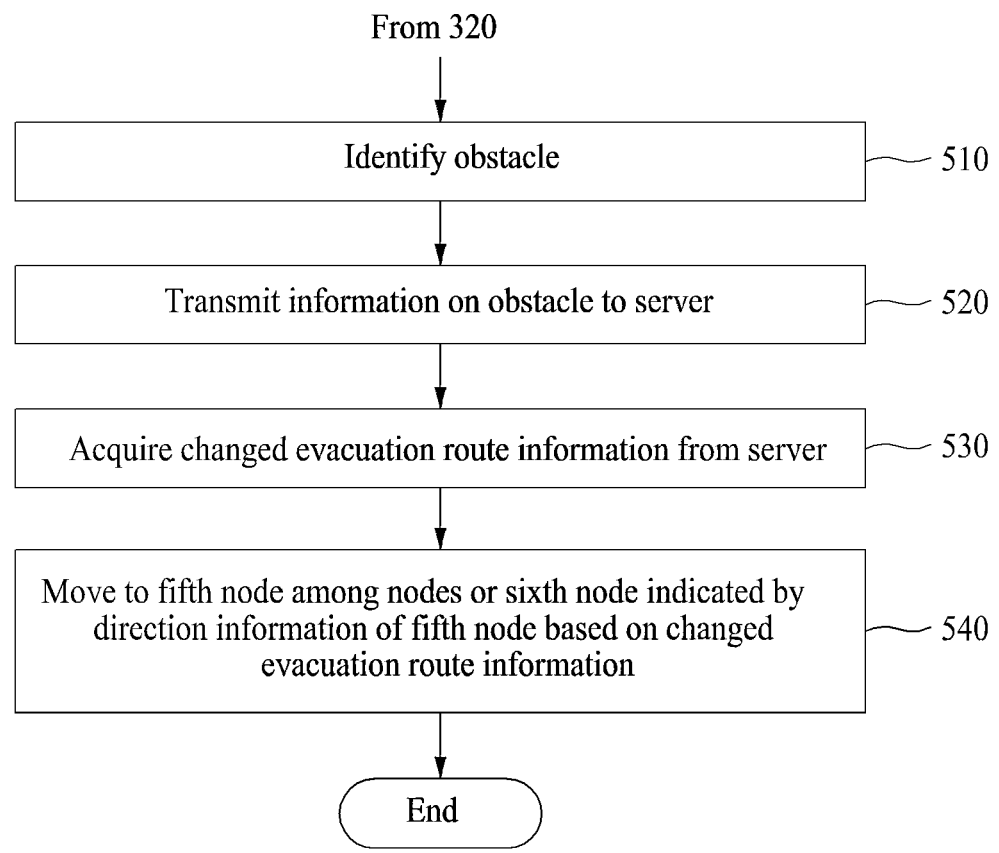
FIG. 5 is a flowchart illustrating a method of controlling a robot to acquire changed evacuation route information in response to an obstacle identified by the robot and to guide an appropriate evacuation route to persons in a space according to an example.

FIG. 5 is a flowchart illustrating a method of controlling a robot to acquire changed evacuation route information in response to an obstacle identified by the robot and to guide an appropriate evacuation route to persons in a space according to an example.

A method of controlling a movement of the robot 100 in response to evacuation route information acquired by the robot 100 being changed by identifying an obstacle by the robot 100 is described with reference to FIG. 5.

In response to a change in an environment (e.g., collapse of construction, facility installation, etc.) in the space 50, the server 120 may update the evacuation route information. The updated evacuation route information may also be referred to as changed evacuation route information. Identifying the object by the robot 100 may be an example of the change in the environment in the space 50.

The changed evacuation route information may represent that attribute information and/or direction information associated with at least one node among the plurality of nodes defined in the space 50 is changed. Therefore, the optimal route to the destination node 930 according to the evacuation route information before the change may be changed according to the changed evacuation route information. For example, in the changed evacuation route information, a direction and/or a location in which the robot 100 may move from each node may be changed according to the obstacle identified by the robot 100 and accordingly, the optimal route from each node to the destination node 930 may be changed. Therefore, direction information of at least one node may be changed. Alternatively, in the changed evacuation route information, the destination node 930 corresponding to the safe area may be changed to another node in response to the change in the environment in the space 50. The optimal route may be changed accordingly.

In operation 510, the robot 100 may identify the obstacle while moving to the first node or the second node. The obstacle may be identified by the aforementioned sensor unit 106 (e.g., camera) of the robot 100.

In operation 520, the robot 100 may transmit information on the obstacle to the server 120. For example, the robot 100 may verify a size and/or a location of the obstacle according to sensing by the sensor unit 106 and may transmit corresponding information to the server 120.

The server 120 may change the evacuation route information based on information on the obstacle. For example, the server 120 may reflect the obstacle in a map of the space 50 in consideration of the location and/or the size of the obstacle and may calculate the optimal route from each road to the destination node 930 based on the map in which the obstacle is reflected. The server 120 may generate the changed evacuation route information based on the optimal route.

In operation 530, the robot 100 may acquire, from the server 120, the changed evacuation route information generated by changing the evacuation route information based on information on the obstacle.

In operation 540, the robot 100 may be controlled to move toward a fifth node closest to the robot 100 among the nodes or a sixth node indicated by direction information of the fifth node, such that the robot 100 moves to the destination node 930 while avoiding the danger node 920 and the obstacle based on the changed evacuation route information and the current location of the robot 100.

Here, the fifth node may correspond to the aforementioned first node that is redetermined based on the changed evacuation route information.

Acquisition of the changed evacuation route information in operation 530 may be performed every time the robot 100 identifies an obstacle and transmits information on the obstacle to the server 120.

Technical features described above with reference to FIGS. 1 to 4, 9, and 10 may apply to FIG. 5 as is and thus, repeated description is omitted.

Figure 6:
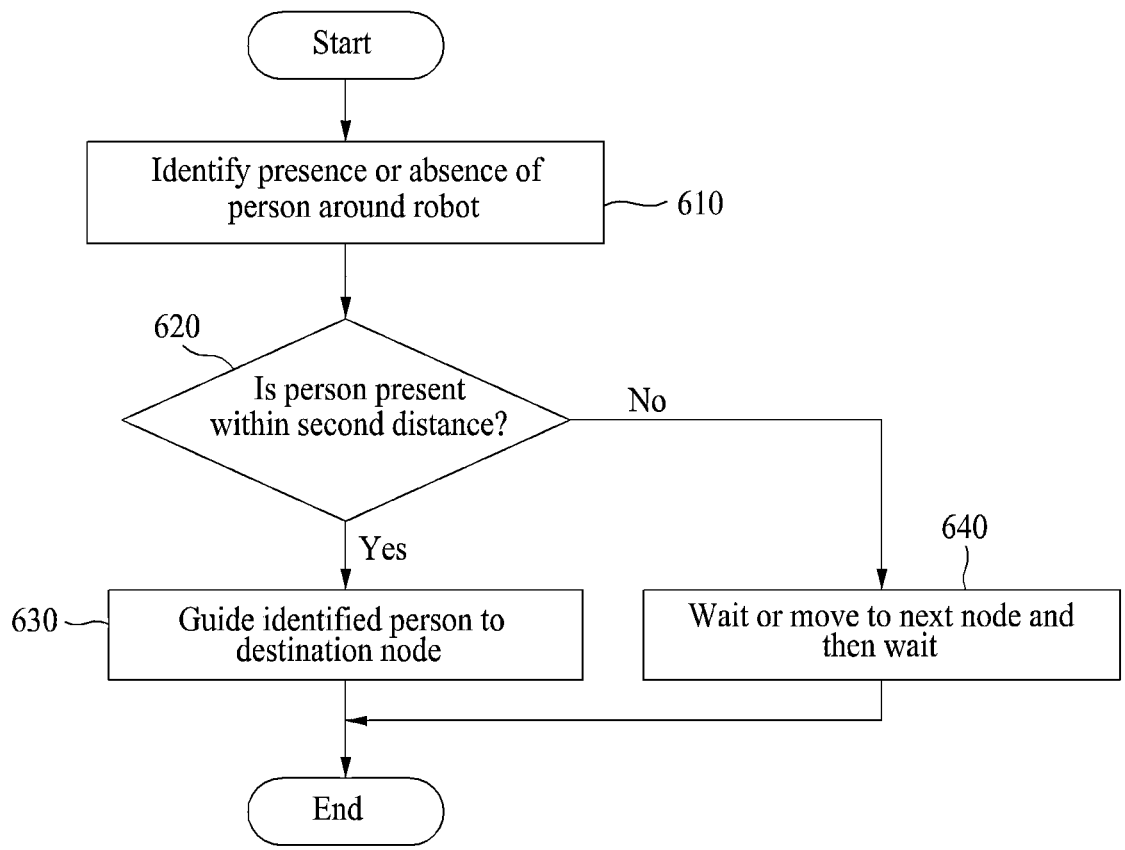
FIG. 6 is a flowchart illustrating a method of controlling a robot to guide an appropriate evacuation route to a corresponding person in response to the person in a space being identified by the robot according to an example.

FIG. 6 is a flowchart illustrating a method of controlling a robot to guide an appropriate evacuation route to a corresponding person in response to the person in a space being identified by the robot according to an example.

As described above, the robot 100 may be configured to guide an appropriate evacuation route to the person 60 in the space 50 when an emergency situation occurs in the space 50.

In operation 610, the robot 100 may identify presence or absence of the person 60 around the robot 100. As in operation 620, for example, the robot 100 may identify whether the person 60 is present within a predetermined second distance. The person 60 may be identified by the aforementioned sensor unit 106 (camera) of the robot 100. The second distance may be a value based on the detection range of the sensor unit 106.

In operation 630, when it is determined that the person 60 is present within the second distance, the robot 100 may be controlled to guide the identified person 60 to the destination node 930. That is, the aforementioned operations 320, 322 to 328 may be performed to guide the corresponding person 60 to the destination node 930 when the person 60 is present within the second distance from the robot 100.

Meanwhile, in operation 640, when it is determined that the person 60 is absent within the second distance, the robot 100 may be controlled to move to the first node and stop, to move to the second node and stop, or to move a distance of a certain radius to identify the person 60. That is, only when the person 60 is present within the second distance, the robot 100 may be controlled to move to the destination node 930 to perform evacuation route guidance.

When the robot 100 and the person 60 move together, a distance between the person 60 and the robot 100 may be maintained to be less than a predetermined third distance. Here, the third distance may be a safe distance between the robot 100 and the person 60 that does not interfere with an operation of the robot 100 or a movement of the person 60.

While the robot 100 and the person 60 are moving together, the robot 100 may continuously or periodically recognize the person 60. If the person 60 is not identified for a certain period of time or more, the robot 100 may be controlled to stop moving to the destination node 930 and to move a distance of a certain radius to identify the person 60.

Accordingly, in an example embodiment, the robot 100 may identify the person 60 in the space 50 and may guide an appropriate evacuation route to the identified person 60.

Meanwhile, in a case in which the robot 100 identifies the person 60 and guides an evacuation route to the destination node 930 to the person 60 while serving as a guide, the movement of the robot 100 may be limited due to a large number of persons 60 or an environmental issue in the space 50.

Here, to expand the range of movement, the robot 100 may set, for example, a collision prevention function of the sensor unit 106 (e.g., LiDAR) to OFF. Alternatively/additionally, the driving unit 108 of the robot 100 may further include a shock absorber, such as a bumper to alleviate shock. The shock absorber may be configured to extend from a body of the robot 100 only when the movement of the robot 100 is limited. Alternatively/additionally, the robot 100 may notify surroundings that the robot 100 is driving through a voice using a speaker or through a lighting using the visual indicator output unit, and may guide the person 60 to not enter the collision prevention sensing range of the robot 100. For example, the visual indicator output unit may be configured to project a radius corresponding to the collision prevention sensing range of the robot 100 onto the floor. Through the projected lighting, the person 60 may not interfere with the movement of the robot 100. The aforementioned third distance may be outside the collision prevention sensing range.

Technical features described above with reference to FIGS. 1 to 5, 9, and 10 may apply to FIG. 6 as is and thus, repeated description is omitted.

Hereinafter, a method of guiding an evacuation route by controlling a movement of the robot 100 using a navigation algorithm installed on the robot 100 is further described with reference to FIGS. 7, 8, 11, and 12.

Figure 7:
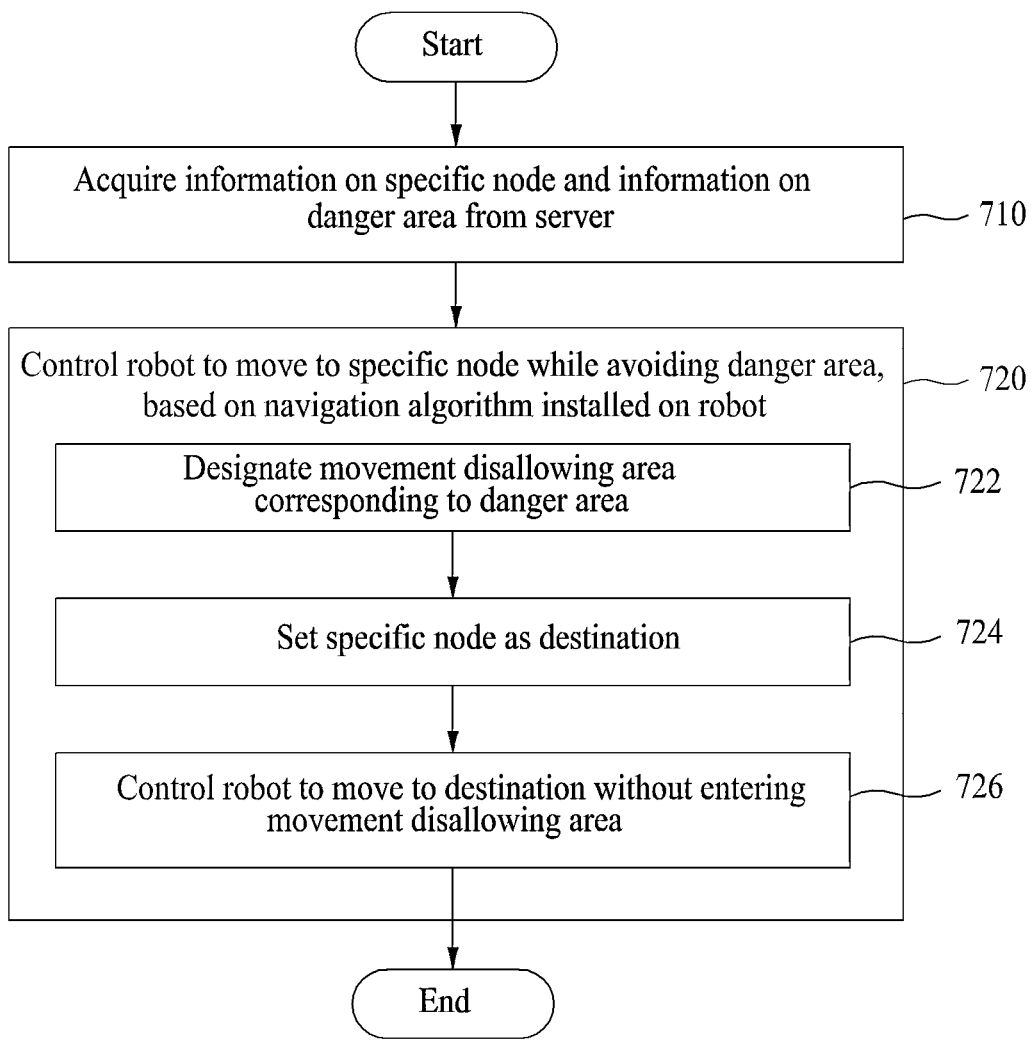
FIG. 7 is a flowchart illustrating a method of controlling a robot to acquire information on a danger area from a server, to avoid the danger area, and to move to a specific node according to an example embodiment.

FIG. 7 is a flowchart illustrating a method of controlling a robot to acquire information on a danger area from a server, to avoid the danger area, and to move to a specific node according to an example embodiment.

In operation 710, the robot 100 may acquire, from the server 120, information on a specific node that is a destination of the robot 100 among the nodes defined in the space 50 and information on a danger area the robot 100 needs to avoid in the space 50.

In operation 720, the robot 100 may be controlled to move from a current location of the robot 100 to the specific node that is the destination, while avoiding the danger area, based on a navigation algorithm installed on the robot 100.

Transmission of information from the server 120 to the robot 100 in operation 710 may be performed periodically, or may be performed when an emergency situation is detected by the server 120 or the robot 100. Contents related to transmission of evacuation route information described above with reference to operation 310 may similarly apply and thus, repeated description is omitted.

In operation 710, information on the specific node that is the destination may not be received from the server 120. For example, when the robot 100 stores a map for the space 50, a node of a destination (exit) corresponding to a safe area may be already know and thus, the robot 100 may not need to separately acquire information on the specific node from the server 120.

However, when information on the specific node relates to a separate node designated by the server 120, the robot 100 may need to receive information on the corresponding specific node from the server 120. Here, the specific node refers to a node to which the robot 100 needs to move when the emergency situation occurs, and may be, for example, a node of an area in which the person 60 is present (or estimated to be present). For example, the specific node may represent a node to which the robot 100 needs to first move in order to guide an evacuation route.

Information on the danger area may include information on the danger node 920 corresponding to the danger area.

A method of controlling the movement of the robot 100 using the navigation algorithm is further described with reference to operations 722 to 726.

In operation 722, the robot 100 may designate a surrounding area of a node (i.e., danger node 920) corresponding to the danger area among the nodes as a movement disallowing area of the robot 100. For example, an area corresponding to a circle or a square with a predetermined radius from the node corresponding to the danger area may be designated as the movement disallowing area.

In operation 724, the robot 100 may set the specific node as the destination from the current location of the robot 100.

In operation 726, the robot 100 may be controlled to move from the current location to the specific node corresponding to the destination without entering the set movement disallowing area.

The robot 100 may be controlled to move to the specific node corresponding to the destination without entering the movement disallowing area based on a route plan using the installed navigation algorithm.

Figure 11:
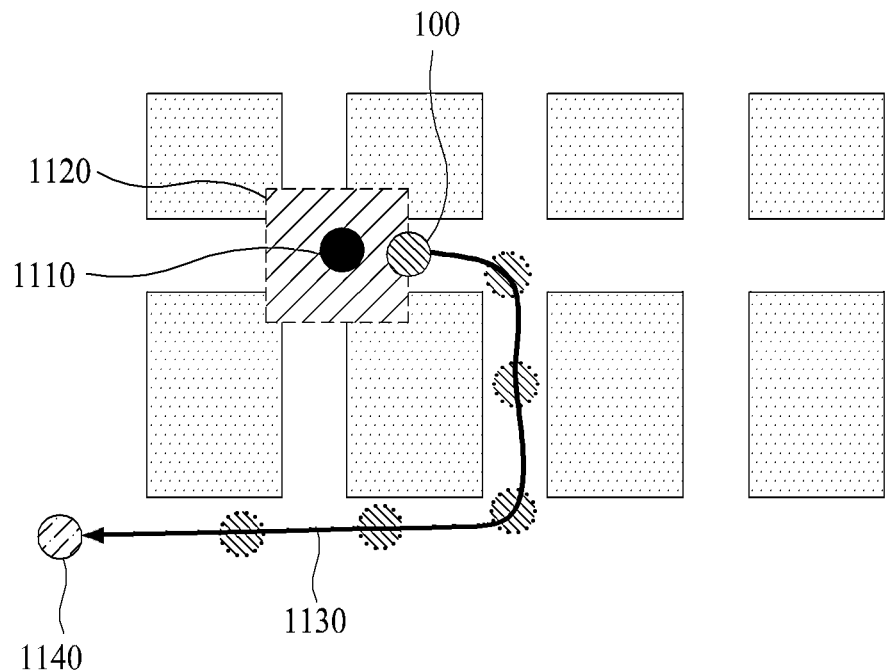
FIG. 11 illustrates a method for a robot to move to a destination while avoiding a danger area using a navigation algorithm installed on the robot according to an example.

In this regard, FIG. 11 illustrates a method for a robot to move to a destination while avoiding a danger area using a navigation algorithm installed on the robot according to an example.

As illustrated, as information on a danger node 1110 is received from the server 120, a movement disallowing area 1120 may be set and the robot 100 may be controlled to move toward a specific node 1140 that is a destination, without entering the movement disallowing area 1120 using the installed navigation algorithm. A route through which the robot 100 moves under control based on the navigation algorithm is illustrated as a route 1130.

Accordingly, the robot 100 receives only minimum node information on the danger area and the destination (if necessary) from the server 120 and may be controlled to move to the destination based on the navigation algorithm. That is, in an example embodiment, generation of the optimal route to the destination may be performed on the side of the robot 100.

Figure 12:
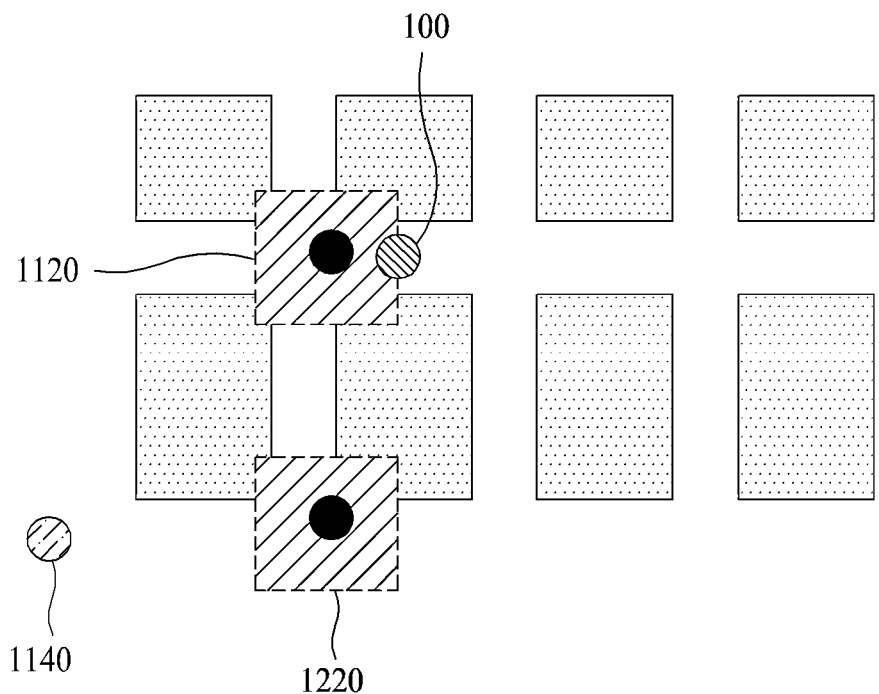
FIG. 12 illustrates a method of setting a movement disallowing area that is a danger area in a space according to an example.

Meanwhile, FIG. 12 illustrates a method of setting a movement disallowing area that is a danger area in the space 50 according to an example.

Referring to FIG. 12, two or more movement disallowing areas 1120 and 1220 may be present according to the number of danger nodes. Also, the robot 100 may receive information on a specific node and/or information on a danger area being updated from the server 120 while moving and may update an optimal route for driving accordingly. For example, in response to a change in a destination or a change in the number of danger areas and/or a location thereof, the robot 100 may update the optimal route. Updating the optimal route may be referred to as reconfiguring (updating) a map of the space 50 in which the robot 100 travels.

Technical features described above with reference to FIGS. 1 to 6, FIG. 7, and FIG. 10 may apply to FIGS. 7, 11, and 12 as is and thus, repeated description is omitted.

Figure 8:
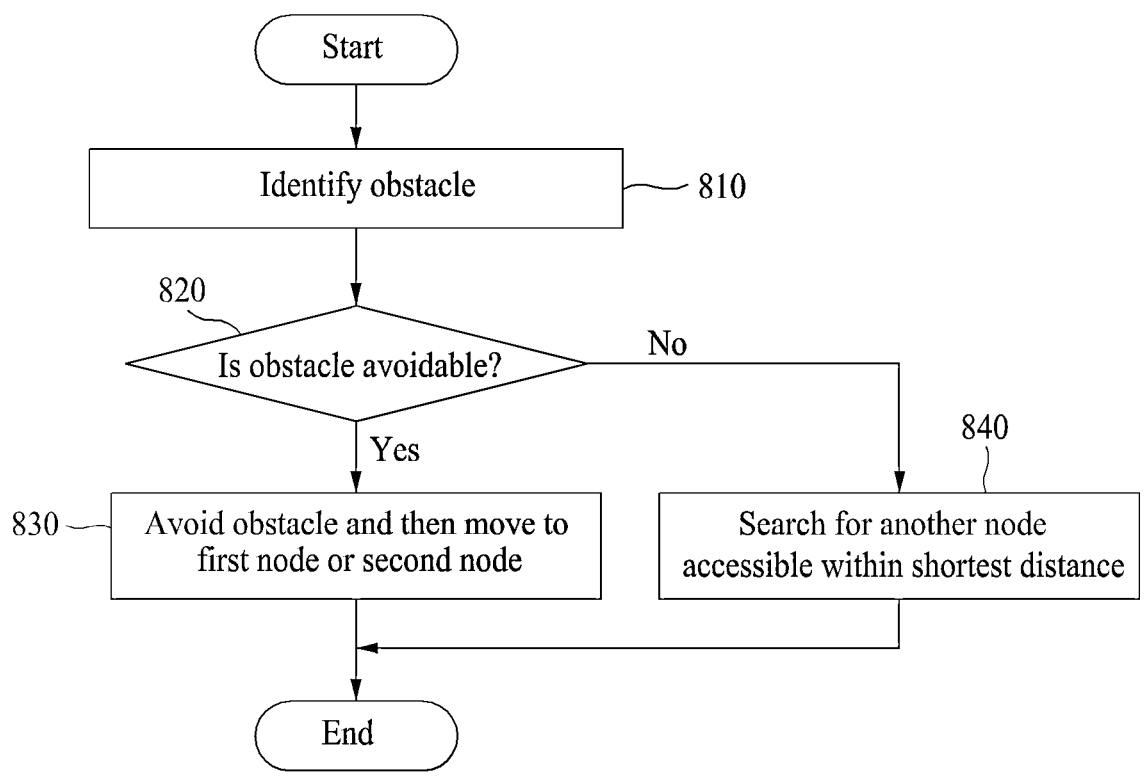
FIG. 8 is a flowchart illustrating a method of controlling a robot to avoid an obstacle in response to the obstacle being identified by the robot and move and then to guide an appropriate an evacuation route to persons in a space according to an example.

FIG. 8 is a flowchart illustrating a method of controlling a robot to avoid an obstacle in response to the obstacle being identified by the robot and move and then to guide an appropriate an evacuation route to persons in the space 50 according to an example.

In operation 810, the robot 100 may identify the obstacle while moving to the aforementioned first node or second node. The obstacle may be identified by the sensor unit 106 (camera) of the robot 100.

In operation 820, the robot 100 may determine whether it is possible to avoid the obstacle identified by the robot 100 and to move toward the first node or the second node based on the installed navigation algorithm. The robot 100 may determine an avoidance probability based on a size and a location of the identified obstacle. The robot 100 may determine that it is possible to avoid the corresponding obstacle when the robot 100 is capable of moving by avoiding the obstacle within a certain period of time or when the robot 100 is capable of moving around the obstacle without turning back more than a certain distance.

In operation 830, when it is determined that the robot 100 is capable of moving by avoiding the identified obstacle, the robot 100 may be controlled to avoid the corresponding obstacle based on the installed navigation algorithm and then move toward the first node or the second node according to the aforementioned operation 320.

In operation 840, when the robot 100 is incapable of moving by avoiding the identified obstacle, the robot 100 may be controlled to move toward a seventh node that is a node to which the robot 100 is accessible by a shortest distance (or shortest time) among the nodes or an eighth node indicated by direction information of the seventh node, based on evacuation route information, the current location of the robot 100, and the obstacle. That is, if the robot 100 is incapable of moving by avoiding the identified obstacle, the robot 100 may search for another node to which the robot 100 is accessible using the shortest distance (or shortest time) and may move to the other node or a node indicated by direction information of the other node. The robot 100 may transmit information on the obstacle to the server 120 and may receive, from the server 120, the changed evacuation route information in which the obstacle is reflected. Therefore, the robot 100 may be controlled to move using the changed evacuation route information. Description related to operations 520 to 540 may similarly apply to operation 840 and thus, repeated description is omitted. Here, the seventh node may correspond to the aforementioned first node that is redetermined based on the changed evacuation route information (i.e., the fifth node described above with FIG. 5).

Technical features described above with reference to FIGS. 1 to 7 and FIGS. 9 to 12 may apply to FIG. 8 as is and thus, repeated description is omitted.

A method of controlling a movement of the robot 100 using a navigation algorithm installed on the robot 100 described above with reference to FIGS. 7, 8, 11, and 12 refers to a separate method of guiding an evacuation route and may apply to the robot 100 and thereby be used separate from the method described above with reference to FIGS. 1 to 6. Alternatively, a method of controlling a movement of the robot 100 using the navigation algorithm installed on the robot 100 may be used as an auxiliary to the method described above with reference to FIGS. 1 to 6 (e.g., obstacle identification processing described above with reference to FIG. 8; and movement of the robot 100 to a location at which the person 60 is present, described above with reference to FIG. 7).

The evacuation route (optimal route) through which the robot 100 of an example embodiment moves for evacuation route guidance may be calculated through an evacuation route calculation algorithm of an evacuation route guidance system for any type of the space 50. Therefore, an evacuation route guidance method using the robot 100 of an example embodiment may be compatible with the existing systems.

The evacuation route information 900 described above with reference to FIG. 9 may be built through a separate builder program. The builder program may support generation of the evacuation route information 900 by designating nodes at intersections in a two-dimensional (2D) model or a three-dimensional (3D) model corresponding to the space 50, by connecting between the nodes with edges, by defining attribute information and direction information of a node, and by defining direction information of an edge. The builder program may be installed and run on the server 120 or a terminal that is a computing device of an administrator managing the server 120.

The apparatuses described herein may be implemented using hardware components, software components, and/or combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be implemented in the form of computer instructions executable through various computer devices and recorded in non-transitory computer-readable media. Also, the media may include, alone or in combination with the program instructions, data files, data structures, and the like. Program instructions stored in the media may be those specially designed and constructed for the example embodiments, or they may be of the kind well-known and available to those having skill in the computer software arts. Examples of the media include magnetic media such as hard disks, floppy disks, and magnetic tapes; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The hardware device may be configured to operate as at least one software module to perform operations of the example embodiments, or vice versa.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A robot control method performed by a robot that travels in a space, the robot control method comprising:
   acquiring evacuation route information on the space from a server when an emergency situation occurs in the space, the evacuation route information including node information on each node of a plurality of nodes corresponding to all nodes defined in the space and the node information including direction information on a direction toward an adjacent next node to which the robot needs to move from the each node; and
   moving the robot toward a first node among the plurality of nodes closest to the robot or a second node indicated by direction information of the first node, based on the evacuation route information and a current location of the robot, the second node being an adjacent next node to the first node and the direction information of the first node indicating a direction toward the second node,
   wherein the direction information of the each node indicates, as a portion of an optimal route from the each node to a destination node among the plurality of nodes, a direction toward the adjacent next node to which the robot needs to move from the each node,
   the robot is controlled to move to the destination node based on the evacuation route information,
   the node information includes attribute information representing an attribute of the each node,
   the destination node includes a first attribute indicating a safe area for the emergency situation as the attribute information,
   the optimal route represents a route to move from the each node to the destination node, avoiding a danger node that includes a second attribute indicating a danger area for the emergency situation as the attribute information among the plurality of nodes, and
   the first node and the second node do not include the second attribute as the attribute information,
   wherein the robot control method further comprises:
     identifying whether a person is present within a predetermined first distance from the robot,
   wherein the moving of the robot is performed to guide the person to the destination node when the person is present within the predetermined first distance,
   wherein the moving of the robot comprises controlling the robot as a guide mode for the person to move to a destination while maintaining a distance between the person and the robot to be less than a predetermined second distance,
   wherein the controlling the robot as the guide mode comprises:
     while the robot and the person are moving together, continuously or periodically identifying the person; and
     in response that the person is not identified for a predetermined period of time or more, controlling the robot to stop moving to the destination;
     in response that movement of the robot is determined to be limited due to presence of a predetermined number or more of persons around the robot, setting a collision prevention function of the robot to OFF to expand a range of movement of the robot for identifying the person, and extending a shock absorber including a bumper from a body of the robot; and controlling the robot to move within a predetermined radius to identify the person while the collision prevention function of the robot is set to OFF and the shock absorber is extended from the body of the robot.

2. The robot control method of claim 1, wherein, in response to a change in the emergency situation, the evacuation route information is changed, the changed evacuation route information indicates that the attribute information and the direction information associated with at least one node among the plurality of nodes are changed and the optimal route by the evacuation route information is changed in response to the changed evacuation route information, and the robot control method further comprises:

acquiring the changed evacuation route information from the server; and moving the robot toward a third node closest to the robot among the plurality of nodes or a fourth node indicated by direction information of the third node, such that the robot moves to the destination node while avoiding the danger node based on the changed evacuation route information and the current location of the robot, wherein the fourth node is an adjacent next node to the third node and the direction information of the third node indicates a direction toward the fourth node.

3. The robot control method of claim 1, further comprising:

identifying an obstacle while moving to the first node or the second node;

transmitting information on the obstacle to the server;

acquiring, from the server, changed evacuation route information generated by changing the evacuation route information based on the information on the obstacle; and moving the robot toward a fifth node closest to the robot among the plurality of nodes or a sixth node indicated by direction information of the fifth node, such that the robot moves to the destination node while avoiding the obstacle based on the changed evacuation route information and the current location of the robot, wherein the sixth node is an adjacent next node to the fifth node and the direction information of the fifth node indicates a direction toward the sixth node.

4. The robot control method of claim 1, further comprising:

acquiring, from the server, information on a specific node that is a destination of the robot among the plurality of nodes and information on the danger area the robot needs to avoid in the space; and controlling the robot to move from the current location of the robot to the specific node while avoiding the danger area, based on a navigation algorithm installed on the robot.

5. The robot control method of claim 4, wherein the controlling of the robot comprises:

designating a surrounding area of a node corresponding to the danger area among the plurality of nodes as a movement disallowing area of the robot;

setting the specific node as a destination from the current location of the robot; and controlling the robot to move from the current location of the robot to the destination without entering the movement disallowing area.

6. The robot control method of claim 1, further comprising:

identifying an obstacle while moving to the first node or the second node; and determining whether it is possible for the robot to avoid the obstacle and to move toward the first node or the second node based on a navigation algorithm installed on the robot, wherein the method further comprises:

moving the robot toward the first node or the second node according to moving the robot after avoiding the obstacle based on the navigation algorithm installed on the robot when it is possible for the robot to move based on the determination for the robot to avoid the obstacle; and moving the robot toward a seventh node that is another node to which the robot is accessible by a shortest distance among the plurality of nodes or an eighth node indicated by direction information of the seventh node, based on the evacuation route information, the current location of the robot, and the obstacle when it is not possible for the robot to move based on the determination for the robot to avoid the obstacle, wherein the eighth node is an adjacent next node to the seventh node and the direction information of the seventh node indicates a direction toward the eighth node.

7. A robot control method performed by a robot that travels in a space, the robot control method comprising:

acquiring evacuation route information on the space from a server when an emergency situation occurs in the space, the evacuation route information including node information on each node of a plurality of nodes corresponding to all nodes defined in the space and the node information including direction information on a direction toward an adjacent next node to which the robot needs to move from the each node; and moving the robot toward a first node among the plurality of nodes closest to the robot or a second node indicated by direction information of the first node, based on the evacuation route information and a current location of the robot, the second node being an adjacent next node to the first node and the direction information of the first node indicating a direction toward the second node, wherein the direction information of the each node indicates, as a portion of an optimal route from the each node to a destination node among the plurality of nodes, a direction toward the adjacent next node to which the robot needs to move from the each node, the robot is controlled to move to the destination node based on the evacuation route information, and the robot is controlled to move to the destination node in response to repeatedly performing the moving the robot, and the moving of the robot comprises:

identifying the first node closest to the robot from among the plurality of nodes based on the evacuation route information and the current location of the robot;

determining a distance between the first node and the current location;

moving the robot toward the first node if the distance is greater than a predetermined first distance; and moving the robot toward the second node if the distance is less than or equal to the first distance, wherein the robot control method further comprises:

identifying whether a person is present within a predetermined second distance from the robot, wherein the moving of the robot is performed to guide the person to the destination node when the person is present within the predetermined second distance, wherein the moving of the robot comprises controlling the robot as a guide mode for the person to move to a destination while maintaining a distance between the person and the robot to be less than a predetermined third distance, wherein the controlling the robot as the guide mode comprises:
- while the robot and the person are moving together, continuously or periodically identifying the person;
- in response that the person is not identified for a predetermined period of time or more, controlling the robot to stop moving to the destination;
- in response that movement of the robot is determined to be limited due to presence of a predetermined number or more of persons around the robot, setting a collision prevention function of the robot to OFF to expand a range of movement of the robot for identifying the person, and extending a shock absorber including a bumper from a body of the robot; and
- controlling the robot to move within a predetermined radius to identify the person while the collision prevention function of the robot is set to OFF and the shock absorber is extended from the body of the robot.

* * * * *